United States Patent [19]

Couper

[11] 3,842,473

[45] Oct. 22, 1974

[54] BEARINGS
[75] Inventor: Neale S. Couper, Darvel, Scotland
[73] Assignee: The Glacier Metal Company, Limited, Middlesex, England
[22] Filed: July 31, 1973
[21] Appl. No.: 384,262

Related U.S. Application Data
[63] Continuation of Ser. No. 210,963, Dec. 22, 1971, abandoned.

[52] U.S. Cl. ............... 29/149.5 C, 72/166, 72/169, 72/366
[51] Int. Cl. ..................... B21d 53/10, B21d 5/08
[58] Field of Search ............. 72/166, 168, 170–175, 72/167, 169, 366; 29/149.5 A, 149.5 C, 149.5 D, 149.5 P

[56] References Cited
UNITED STATES PATENTS
2,327,706   8/1943   Halstead ............................ 72/166
3,503,109   3/1970   Krall ................................... 72/168

Primary Examiner—Milton S. Mehr
Attorney, Agent, or Firm—Watson, Cole, Grindle & Watson

[57] ABSTRACT

This invention is a method and apparatus for rolling an arcuate plain bearing shell from a blank strip having one or two side flanges. It is forced between two rollers shaped so that the bite corresponds in contour to the section of the final bearing. The flange is formed to shape as the shell is curved by causing the roller surface in contact with the flange edge to move at a linear speed related to that of the roller surface in contact with the journal in proportion to the ratio in the final bearing.

11 Claims, 5 Drawing Figures

PATENTED OCT 22 1974  3,842,473

BEARINGS

This is a continuation of application Ser. No. 210,963 filed Dec. 22, 1971 and now abandoned.

This invention relates to a method and apparatus for manufacturing arcuate plain bearings having a side flange at one or each side. Arcuate plain bearings such as half journal shells which do not have side flanges can conveniently be formed by rolling. But this is difficult where the bearing has a side flange although bearings with side flanges are frequently required where axial thrusts are to be carried.

According to one aspect of the present invention, a method of manufacturing such a bearing comprises feeding a metal blank between a pair of rollers contoured to deform the flange, the rollers being driven at speeds such that the part of one roller in contact with parts of the arcuate bearing of greater radius moves at a linear speed faster than part of the other roller in contact with parts of the arcuate bearing of smaller radius to form the bearing with the arcuate shape.

This method tends to extend the edges of the flanges as they are deformed and so tends to prevent the edges of the flanges cracking as would be very likely to happen if a blank with a preformed flange was merely rolled into arcuate form, and if there is little or no slipping between the parts of the rollers and the corresponding parts of the bearing good metal flow can be achieved to assist in getting an arcuate form without cracking and also without damaging a bearing lining on the metal blank. Thus preferably the ratio of the said linear speeds is the same as the ratio of the said radii.

A further roller which could co-operate with one of the first rollers can grip the leading end of the blank and help to pull it through the first rollers and this helps to achieve a continuously operating method in which the rollers rotate continuously in one direction and straight blanks enter the system continuously and arcuate bearings leave the system continuously.

According to a second aspect of the present invention apparatus for manufacturing such bearings comprises a pair of rollers contoured in accordance with the described final section, and means for driving the rollers at respective speeds such that part of one roller corresponding to parts of the contour of greater radius moves at a linear speed faster than part of the other roller corresponding to parts of the contour of small radius.

The said parts of the rollers may have high friction surfaces so that there will be little or no sliding with corresponding parts of the bearing being formed.

Also one roller may have an independently movable sleeve capable of rotating at a speed determined by the speed of the other roller, although it turns about the axis of the one roller, and this also can reduce relative sliding between roller and blank.

The invention may be carried into practice in various ways, and one embodiment will now be described by way of example with reference to the accompanying drawings, in which.

Figure 1:
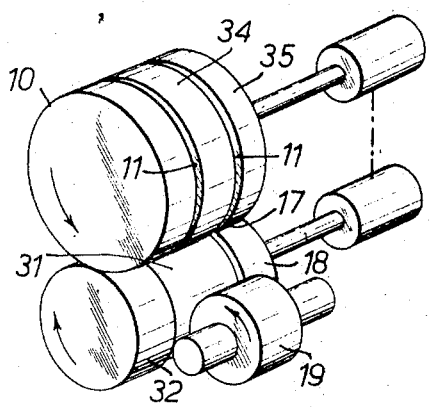
FIG. 1 is a perspective view of one arrangement of the rollers of the apparatus.
Figure 2:
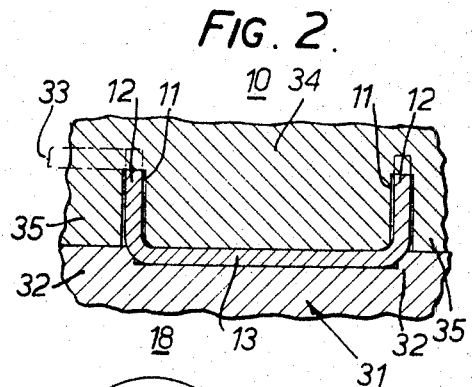
FIG. 2 is a section through a blank having a flange on each side, thus forming a channel section.

The part shown in FIG. 2 is formed from a strip of a rigid material such as steel coated with a layer of bearing material on the lower surface in FIG. 2. Then the strip is cut into blanks, and the side flanges 12 are provided at each side of the journal part 13 to carry end thrusts. The blanks are then straight with a uniform section as shown in FIG. 2 and a length about 4 percent less than the desired arcuate journal surface in the finished shell.

A first pair of rollers comprises an outer roller 10 and an inner roller 18. The inner roller 18 is shaped to have a central section 31 which conforms to the journal profile of the bearing and flange sections 32 at either side. The outer roller has two grooves 11 machined in it to accommodate the flanges 12 on the blank metal strip 13. These grooves 11 have a depth less than the height of the flanges 12 on the unformed blank by the amount 33 in FIG. 2 but the depth of the grooves represents the desired height of the flanges on the finished bearing. A central section 34 is in contact with the back of the journal part 13, and flanges 35 are at either side.

In operation, the blank is fed between the rollers where it is formed into the desired shape. The journal part 13 is slightly reduced in the bite 31, 34 and the flanges are formed in the bite between the grooves 11 and the section 31. The rollers are driven at speeds proportional to the radii of the finished journal and the edges of the flanges with the roller 10 moving the faster. The roller surfaces are surfaces of high friction with the blank and assist in curving the material at the same time as it is caused to flow in the roller bites.

Figure 5:
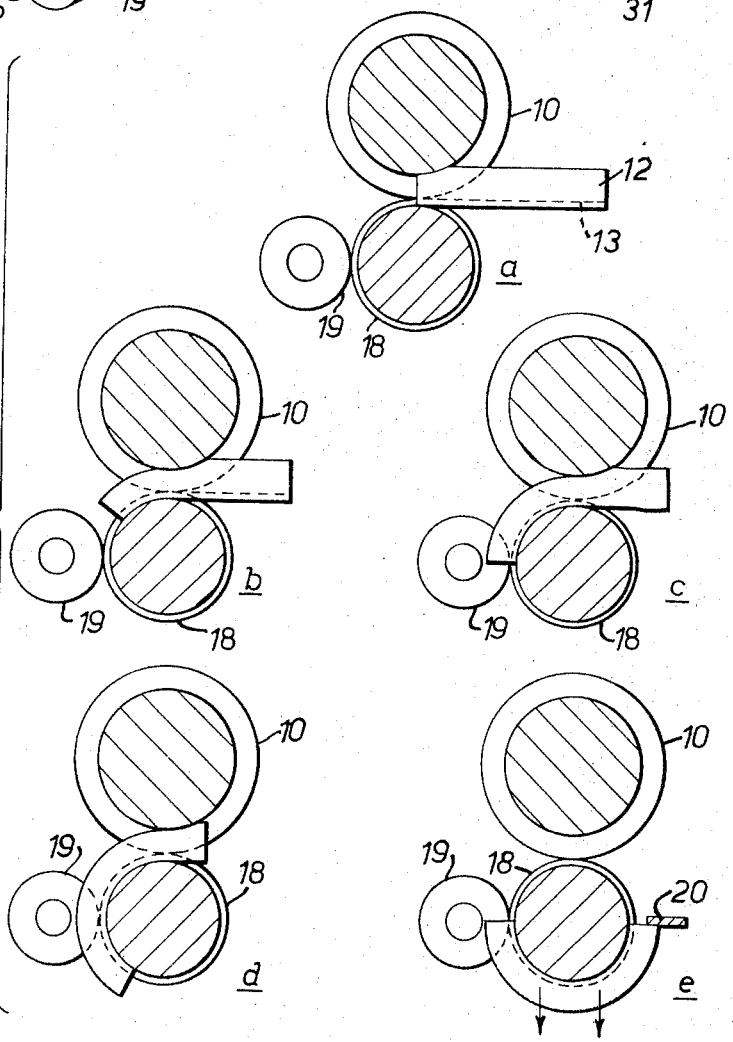
FIGS. 5a to 5e show different stages during the manufacture of a flanged bearing.

A third roller 19 which has a width equal to the distance between the flanges on the finished bearing cooperates with the roller 18 to help pull the arcuate shell through the roller system as shown in FIG. 5 until it strikes a stop member 20, FIG. 5e, and can be released as indicated by the arrows.

The use of the differential roller speeds and the reduction in area avoid to a considerable extent cracking of the bearing lining and of the flange material as the bearing is shaped.

Figure 3:
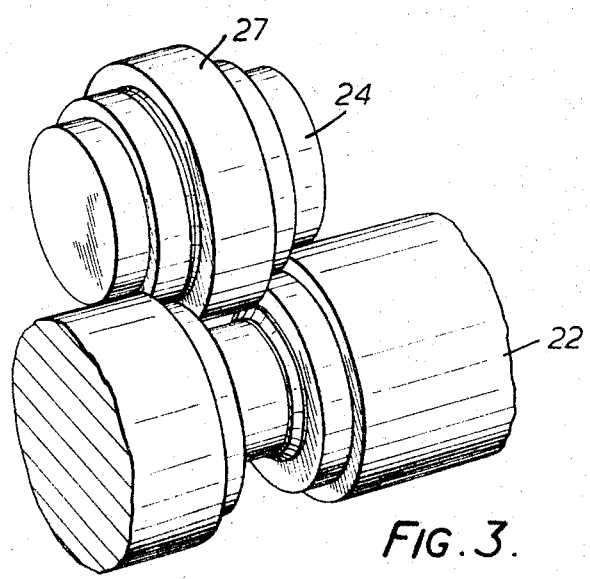
FIG. 3 is a similar view showing a modification of two of the rollers.
Figure 4:
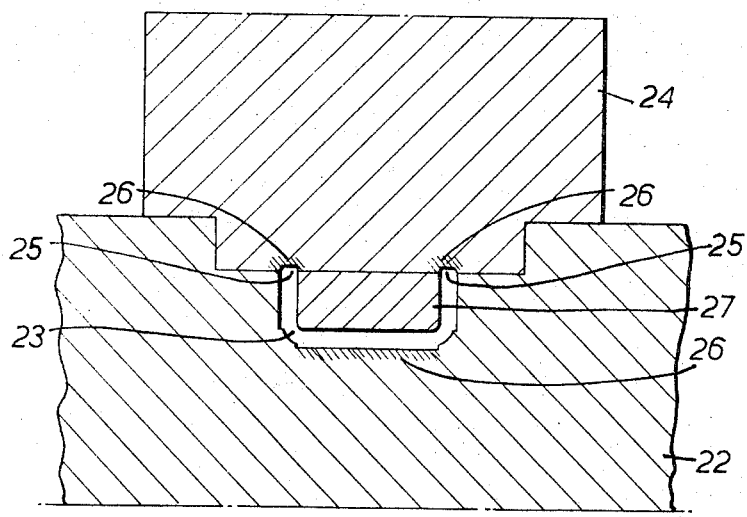
FIG. 4 is a section through the bite of the rollers of FIG. 3.

In the modification of FIGS. 3 and 4, the roller 18 is replaced by a roller 22 having a recess 23 corresponding to the journal surface and the outer flange surfaces of the finished bearing. The roller 10 is replaced by a roller 24 with shallow grooves 25 corresponding to the edge of the finished flanges as shown in FIG. 4. The surfaces which move at different velocity in contact with the journal surface and the flange edges respectively, are surfaces having a high coefficient of friction with the bearing material, as shown at 26. The action tends to move the flange edges further than the journal surface to form the arc at the same time as the flange is given its final shape. The part 27 of the roller 24 which forms the back of the journal section of the bearing is free to rotate independently of the rest of the roller 24 so that it is free to move at the same speed as the journal section of the bearing.

It will be noted that the rollers in both embodiments do not reverse in operation, but continue to rotate in one direction and a complete revolution produces two bearing shells.

What I claim as my invention and desire to secure by Letters Patent is:

1. A method of manufacturing an arcuate plain bearing having a journal surface and a side flange comprising feeding a metal blank between a pair of rollers contoured to form the flange, the rollers being driven at speeds such that part of one roller corresponding to the edge of the flange and part of the other roller corresponding to the journal surface move at respective linear speeds in proportion to the radii of the journal surface and the edge of the side flange, to form the bearing with the arcuate shape without slipping between the rollers and respective contacting surfaces of the edge of the flange and the journal surface.

2. A method as claimed in claim 1, in which the blank has a preformed side flange.

3. A method as claimed in claim 1 including a further roller which grips the leading end of the blank and helps to pull it through the first rollers to produce the arcuate form.

4. A method as claimed in claim 1 in which a newly formed flanged bearing shell is released after a single pass of the blank through the rollers.

5. A method as claimed in claim 1 in which the rollers rotate continuously in one direction.

6. Apparatus for manufacturing an arcuate plain bearing having a journal surface and a side flange from a metal blank comprising a pair of rollers contoured in accordance with a desired first section, and means for driving the rollers at respective speeds for ensuring that part of one roller corresponding to the edge of the flange and part of the other roller corresponding to the journal surface move at respective linear speeds in proportion to the radii of the journal surface and the edge of the side flange.

7. Apparatus as claimed in claim 6 in which the said parts of the rollers have high friction surfaces.

8. Apparatus as claimed in claim 6 in which one roller has an independently movable sleeve which is free to rotate.

9. Apparatus as claimed in claim 8 in which the sleeve corresponds with the back of the journal surface.

10. Apparatus as claimed in claim 6 including a further roller for assisting in pulling the blank through the said rollers.

11. Apparatus as claimed in claim 6 in which the rollers are driven continuously without reversing.

* * * * *